United States Patent Office 3,449,913
Patented June 17, 1969

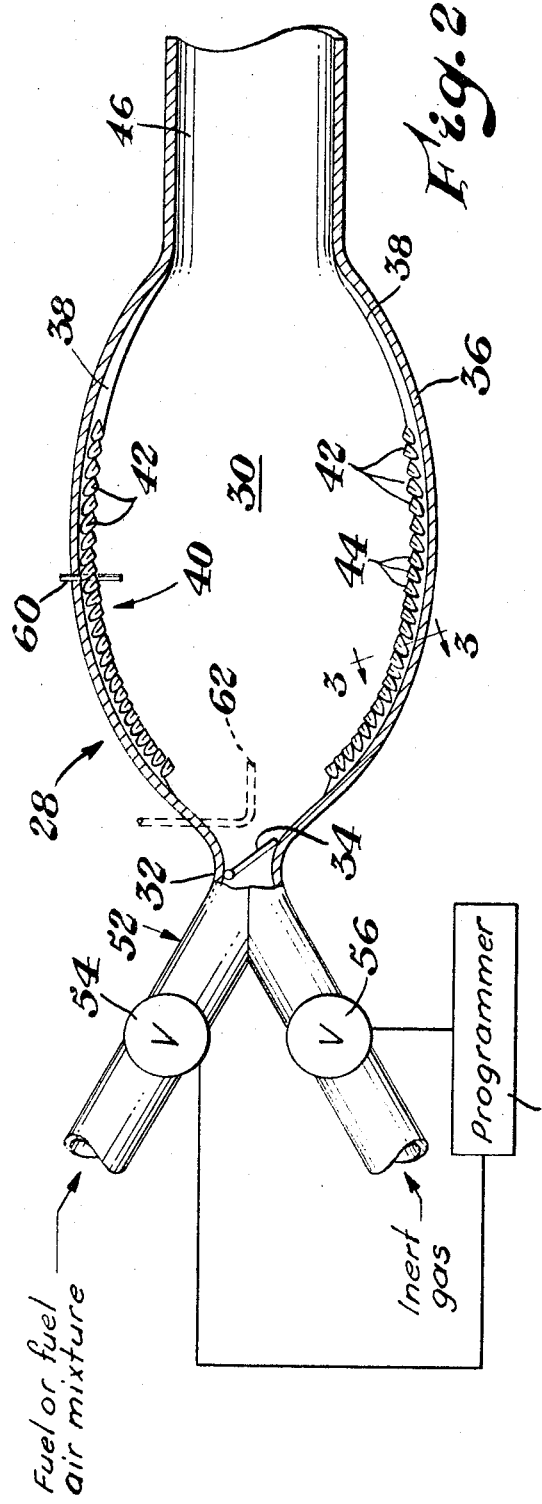
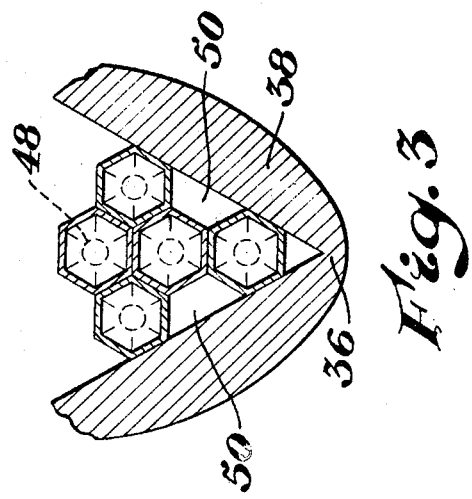

3,449,913
COMBUSTION PROCESS
John J. Grebe, 12430 W. St. Andrew,
Sun City, Ariz. 85351
Continuation-in-part of application Ser. No. 584,916, Oct. 6, 1966, which is a continuation-in-part of application Ser. No. 480,519, Aug. 17, 1965. This application Jan. 29, 1968, Ser. No. 701,254
The portion of the term of the patent subsequent to Jan. 30, 1985, has been disclaimed and dedicated to the public
Int. Cl. F23r 1/14; F02k 7/00
U.S. Cl. 60—204          9 Claims

ABSTRACT OF THE DISCLOSURE

The invention is an improved combustion apparatus and process for generating a high kinetic energy working gas stream wherein a combustion tube is fitted with igniting means, a check valve assembly, separate air and fuel or fuel-air mixture injection means and supply source, a displaceable inert mass injection means and supply source and an exhaust. The high energy working product stream is produced by controllably introducing separately and sequentially predetermined amounts of a fuel and air or a preblended fuel-air combustion mixture and a mass of a displaceable inert mass, usually a gas, into the combustion tube and utilizing the heat of combustion from rapid combustion of the fuel-air combustion mixture to accelerate the inert displaceable mass.

Background of the invention

This application is a continuation-in-part of application Ser. No. 584,916, filed Oct. 6, 1966, now Patent No. 3,365,880, which in turn was a continuation-in-part of application Ser. No. 480,519, filed Aug. 17, 1965, now abandoned.

The present invention relates to energy conversion and more particularly is concerned with an improvement in the combustion process and apparatus for generating high kinetic energy, high pressure gases as disclosed in the parent applications set forth hereinbefore.

It is a principal object of the present invention to provide an improved combustion system giving previously unexpected high kinetic energy and high efficient energy conversion.

It is another object of the present invention to provide an apparatus and process of jet engine operation giving unexpectedly high thrust which requires markedly less inlet air for combustion than conventional combustion processes.

It is another object of the present invention to provide a combustion process for jet engine operation, turbine-electrical assemblies and the like where substantially complete consumption of combustion air is possible and wherein high kinetic energies and high efficiency are obtained while simultaneously cooling burner metal surfaces, turbine nozzles, turbine blades and the like.

It is a further object of the present invention to provide a combustion process which gives a high summation of kinetic energies with simultaneous cushioning of the combustion chamber by inert masses wherein cooler gases are intermittently mixed, i.e. slugged, with hot gaseous explosion products in a novel sequence of operating steps.

It is also an object of the present invention to provide an asssembly for jet propulsion delivering a maximum in useful thrust effects.

It is a further object of the present invention to provide a process of jet propulsion which can be carried out with light weight apparatus of simple design.

It is another object of the present invention to provide an improved combustion system based on the disclosure in applications Ser. No. 584,916 and Ser. No. 480,519 whereby more nearly optimum energy output is realized.

It is also an object of the present invention to provide an improved combustion system which produces a working gas stream of unexpectedly high kinetic energy which simultaneously assures no preignition of an explosive fuel-oxidizer mixture wherein during operation the apparatus is protected against overheating, detrimental thermal and shock stress, and corrosive attack.

It is another object of the present invention to provide a system of fuel injection that permits introducing additional fuel into the mixture of gases after initial expansion stages to reheat and add power production in later stages of expansion in a turbine.

These and other objects and advantages readily will become apparent from the detailed description presented hereinafter when read in conjunction with the drawing in which:

FIGURES 1A–E is a diagram showing schematically the procedural steps for the generation of a high energy working gas stream in a combustion tube following the practice of the present invention;

FIGURE 2 is a sectional view of one embodiment of an apparatus for carrying out the present invention;

FIGURE 3 is a fragmentary view partly in section illustrating a portion of the apparatus depicted in FIGURE 2.

In general in accordance with the present invention, a displaceable inert mass an explosive fuel-oxidizer mixture are separately provided in an explosion chamber in a manner such that at least a portion of the inert mass is in front of the fuel-oxidizer mixture and the explosion chamber is cushioned by the displaceable inert mass. The fuel-oxidizer mixture is explosively fired thereby accelerating the displaceable mass in front of the high velocity, high energy combustion products. The inert mass also serves to cushion the combustion chamber and any hardware associated therewith as one-way check valves, metering equipment and the like from the explosive surge upon combustion. The process is repeated on an orderly cyclic sequence and the resulting high velocity-high kinetic energy working product stream is directed from the explosion chamber and energy extracted therefrom.

Figure 1A:
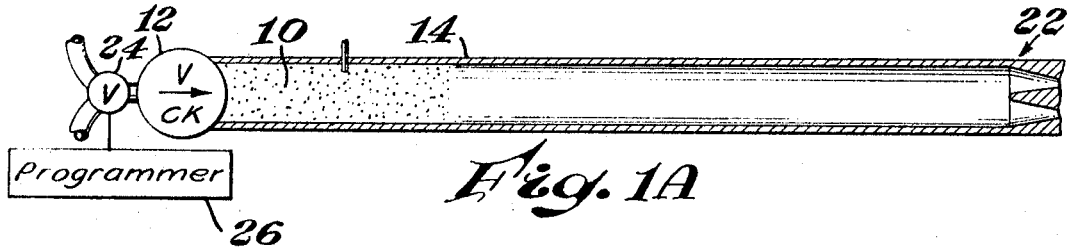
Figure 1B:
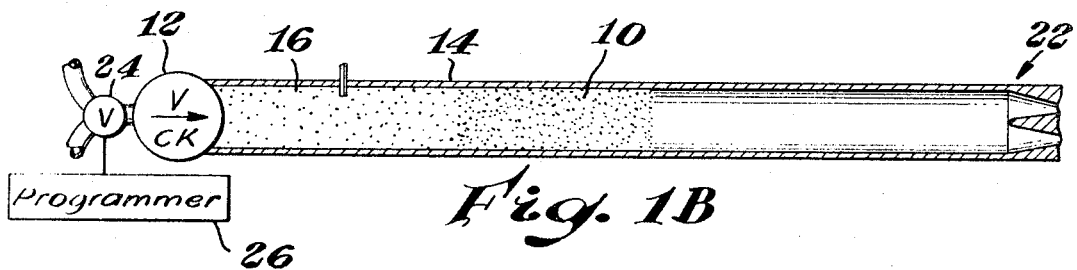
Figure 1C:
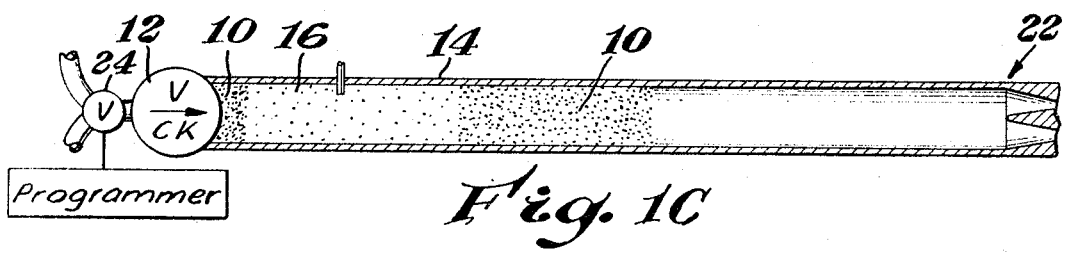
Figure 1D:
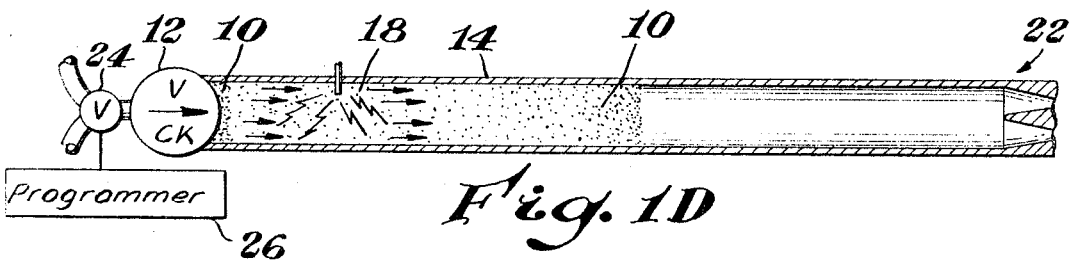
Figure 1E:
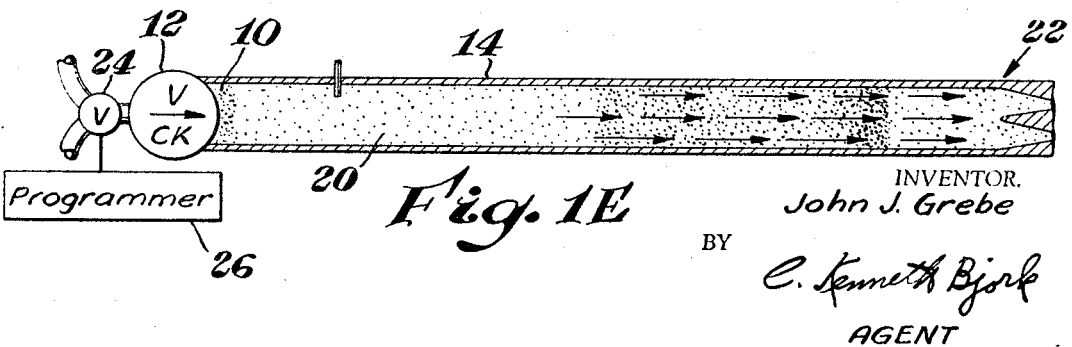

In one embodiment of the present invention as depicted in FIGURES 1A–1E a predetermined quantity of an inert gas 10 from a supply source (not shown) is passed through a check valve 12 into an explosion combustion tube; i.e. explosion chamber 14 fitted for pulse explosive ignition of a fuel-oxidizer combustion mixture (FIGURE 1A); a mixture 16 of fuel and oxidizer, or fuel alone if the oxidizer also is employed as both the oxidizer and the inert gas, the fuel being metered to provide a predetermined fuel-oxidizer mixture is fed into the chamber 14, the quantities of said fuel and oxidizer in the combustion mixture 16 being at a ratio to provide an explosive mixture which gives a predetermined gaseous exhaust product temperature and pressure upon substantially instantaneous ignition (FIGURE 1B); an additional, usually smaller quantity of inert gas 10 is introduced into the explosion chamber 14 behind the explosive mixture 16 (FIGURE 1C); the explosive fuel-oxidizer combustion mixture 16 is substantially instantaneously ignited in the chamber 14 thereby providing high temperature-high velocity gaseous combustion products 18 compressed and accelerated by the explosive combustion surge. The small slug of inert gas 10 behind the combustion products serves as a buffer, acting much like a spring and momentarily at the instant of ignition of the fuel-oxidizer mixture protects the check valve 12 and other hardware and structural members facing the explosion chamber 14 from direct contact by the shock and high temperature of the instantaneous combustion. This slug then becomes a part of the inert gas mass during the next cycle of operation (FIGURE 1D). The hot high velocity compressed and accelerated gaseous combustion products 18 thus become intermittently blended, i.e. slugged, with the cooler inert gas 10 in front (FIGURE 1D). The inert gas mass 10 in front of the combustion products 18 thereby becomes heated and accelerated by the shock waves from the explosive combustion, i.e. the peak of the explosive energy, providing a resultant high temperature-high velocity working gas stream of the entire gaseous mass 20 which is directed toward a venturi nozzle system 22, for example, with high kinetic energy (FIGURE 1E).

Ordinarily this high velocity working gas stream is directed to turbine wheel of a turbojet propulsion engine, exhausted through a thrust producing rocket engine exhaust nozzle or fed to a reciprocating engine, an inertial loading mass like a blast mat, mechanical drive or an electrical power generator as in a power plant or the like.

The resultant gas blend may be subsequently compressed before use, as by a diffuser in the exhaust conduit from the explosion chamber, thus being heated by adiabatic compression for recovery of heat and more energy.

In general, the high kinetic energy working gas stream can be used in any operation whereby substantially controlled explosive power is transformed and/or converted into useful work. To illustrate, the high energy working product stream can be directed against earth, rock and the like strata to effect movements such as ploughing, rock breakage, pile driver operations and the like. Further, plastics, metals and the like deformable media can be shaped, cut, formed and the like using the high kinetic energy working gas stream generated by the process of the present invention.

The additions of inert gas 10, fuel and/or a predetermined fuel-oxidizer mixture 16 and the small following cushion of inert gas 10 to the combustion tube are carried out on a cyclic basis thereby assuring continuity of operation. Conveniently, as shown, introduction of these components can be controlled by a valve assembly 24 operated by a programmer 26.

Usually a petroleum hydrocarbon, e.g. methane, acetylene and the like, is employed as the fuel and air as the oxidizer. However, it is contemplated that other fuel-oxidizer systems also can be used; e.g. Divers' Liquid (ammoniacal solution of ammonium nitrate) can be burned with air or oxygen as oxidizer. Similarly, light metal hydrides as LiH, NaH, $MgH_2$, metal carbides such as $CaC_2$, $Na_2C_2$ etc. and liquid hydrogen and the like fuels can be used.

The terms "intermittently blended" or "slugged" as used herein mean that the cooler inert gas is injected into the combustion chamber or "gun" of the system as a "slug" or mass which is then compressed, heated and accelerated by the following high temperature, high velocity gaseous explosive combustion products. This intermittent slugging is continued whereby the cooler gas is compressed and heated in the gun by successive explosive combustions which follow each slug of cooler inert gas.

By use of the intermittent blending or slugging operation of cooler gases with the hot explosion products from the substantially instantaneous ignition of the explosive fuel-air mixture much higher kinetic energies are realized from combustion of relatively small amounts of fuel at high temperature and high pressure thereby providing for highly efficient operation without excessively heating the combustion tube and accessories such as igniters, check valves, electromagnetic field coils, surface treatments for corner reflection with honeycomb pockets, etc.

Ordinarily, the cooler inert gas for blending with the explosion combustion products can be any gaseous material that does not attack the component parts of the system. Conveniently, this inert "blend gas" can be steam, air, exhaust products as from an engine exhaust or boiler flue gas, partially expanded gaseous products from turbine operation and the like. Usually, the inert blend gas is air obtained from the atmosphere or recycled partially expanded exhaust or used process gases or a combination of air and recycle used process gases. These latter recycle materials are particularly suitable since they have a higher heat capacity and may be at a somewhat elevated pressure.

The actual amount of blend gas to be used is determined from the total volume of working gas desired at a predetermined operating temperature and pressure. Amounts of blend gas ranging from about 0.25 to about 8 times and preferably from about 1 to about 5 times the combustion air stream are satisfactory.

One way of introducing inert gas and fuel-air mixtures into the combustion tubes is to partially pressurize these by a fan, compressor, ram jet inductor, or another explosive gas gun in series, for example, and then force these into the tube through the one way check valve or electromagnetic, mechanical or dynamic shock wave traps.

The actual metering of the fuel or fuel-air mixture and inert gas into the combustion tube in a predetermined sequence can be achieved by controlled valving using electrical, hydraulic, mechanical or other systems which in turn are programmed or otherwise meshed or synchronized with the combustion initiation operation. The ignition of the fuel vaporized or atomized into the burner tube can be by single spark, multiple spark, spark discharge along the length of the combustion chamber, laser beams entering through pinholes, positive ion beams, electron gun beams or other igniting means such as radiant energy absorbers which can be ignited by a high energy radiant energy discharge and in turn ignite the fuel-air combustion mixture. Illustrative of operable radiant energy absorbers which react exothermically upon ignition are carbon disulfide, nitrogen oxides, acetylene, methylacetylene, diacetylene, ethylene, propylene, HCN, cyanogen derivatives, hydrogen-chlorine mixtures, hydrogen-bromine mixtures and the like. The spark generation or other initiation readily can be timed or programmed to coincide with the completion of the explosive fuel-air mixture in the burner tube.

When air is being passed through a burner tube during operation, the composition of the fuel-air mixture for combustion ordinarily is determined by the quantity of fuel introduced into the tube. This readily is achieved by metering the fuel into a given combustion tube in an amount and over the period of time required to provide for desired combustion upon ignition. Ordinarily about stoichiometric fuel-air ratios are employed although a slight excess of air can be employed to assure that all the fuel is burned. If more than about 10 percent excess air is employed in the combustion step, the temperature of the gaseous exhaust products may be detrimentally lowered.

Generally in the practice of the present invention, a plurality of combustion chambers ranging from two to about twelve in number and usually from about four to about eight are employed in combination. In such operations, the resulting working gas stream produced from each chamber is brought into communication with the load, e.g. a turbine or other device to be driven or operated by the high energy working gas stream.

Although for some operations the process is carried out using a single combustion chamber assembly, for most operations if the number of combustion chambers is less than two, it may become somewhat difficult to maintain a smooth high temperature combustion product gas feed to the venturi jet or jets. More than twelve burners can be used although with larger numbers there may be some difficulty of placement and location of these in a boiler or engine system, particularly in smaller-sized equipment.

Combustion or explosion tubes can be constructed in accordance with recognized burner design. They can be equipped with a multiplicity of igniters as well as other devices to assure substantially instantaneous ignition of the fuel-air mixture in the explosion zone with complete combustion of the explosive fuel gas combustion mixture. Additionally, the wall of the combustion zone can be designed to provide a reflecting surface for redistributing heat and light radiation as well as shock waves away from the metal and toward the discharge area thereby assuring that the maximum energy is directed to the working gas stream.

Preceding the entrance of the explosion zone to each burner tube there is positioned a substantially one way passage which prevents high pressure reverse fluid flow such as, for example, a pressure resistant shock wave trap, a controlled poppet or sleeve valve or an appropriate one way check valve. This one way passage, i.e. shock wave trap or check valve, is of a design which assures that the combustion product gases cannot exit back through the entrance of the combustion tube but must go through the exit, i.e. exhaust, and pass to a nozzle of a turbine or other apparatus to do useful work. An electromagnetic field at the inner side of such mechanical valves or shock wave traps may further restrain reverse flow of hot ionized gases and protect the inlet structures, while generating a pulse surge of electric power.

In a particularly useful apparatus for carrying out the present process, cup-shaped projections located in the walls of the combustion tube preceding the actual explosion zone and which provide for streamline, low turbulent flow of gases toward the combustion zone but which simultaneously provide for self-destruction or reversal of back pressure waves are employed as the shock wave traps. Alternatively, conventional one way check valves or other one way gas directing assemblies of a structural strength sufficient to withstand the shock waves generated during the substantially instantaneous explosive combustion of the fuel-air mixture in the explosion zone of the combustion tube can be used in the assembly.

Igniters suitable for use to assure the substantially instantaneous combustion of the fuel-air mixture in the explosion zone can be prepared or selected from a variety of electrical, chemical or radiant energy generators as set forth hereinbefore and as known to one skilled in the art. Ordinarily, these are designed so as to be shielded or otherwise equipped with cooling means such that these are cooled or otherwise separated from the explosion zone during ignitions thereby to assure that these in themselves do not offer or become hot spots which might result as sites for undesirable preignitions.

Air inlet tubes, shock wave traps or check valves, explosive burning tubes and venturi jets can be fabricated from structural materials currently in use and designed to withstand the temperatures and pressures of operation.

The actual design of these components can be varied depending on the size of the power application or type of jet engine, desired thrust, desired horsepower or kilowatts of electrical energy and the like required or desired for a given operation as is understood by one skilled in the art.

One apparatus which is particularly suitable for carrying out the present novel process is that shown in FIGURES 2 and 3.

This embodiment comprises a tubular combustion chamber 28 having an explosion chamber 30 of enlarged diameter intermediate the ends. One end 32 is fitted with a one way check valve assembly 34. The explosion chamber 30 may be fitted around its interior wall 36 with a baffle means, e.g. a multiplicity of fins 38, having shock waves and high energy focusing and thermal shock dissipating means 40 extending substantially the length of the chamber 30.

In this depicted embodiment, the high energy focusing and side wall thermal shock dissipating means 40 comprise at least a one layer thick array of hollow paraboloidal; i.e. acorn shaped, cup members having a honey-comb shaped top 42 attached to the fins 38 at least in the vicinity of the ignition zone. The members 42 are positioned so that their open ends 44 face the exhaust 46. As shown, each of the members 42 is positioned and designed to trap light, thermal and shock waves generated by the explosive combustion and reflect and focus towards the exhaust 46. These members 42 thus provide an additional means to assure that these energy sources do not strike wall 36 and fins 38 as well as serve to minimize the amount of energy transmitted towards valve 34 which must be absorbed by the cushion of inert mass. This serves two useful purposes. It reduces potentially detrimental degradation of the combustion zone wall and keeps this structure cool so that the combustion product gases do not slowly dissipate their heat uselessly at this surface but rather direct this energy towards the inert displaceable mass in front of the exhaust 46 where they undergo rapid conversion into useful work. This serves further to eliminate or substantially minimize the formation of undesirable gaseous species by inhibiting high temperature equilibria.

As shown in the depicted embodiment, the reflecting members 42 are in the shape of cups having an open front 44 and a closed rounded bottom portion. The shape is such that these reflect energy waves towards the exhaust 46. If desired, the bottom can define an opening 48 which gives additional cooling effect without detrimentally affecting the reflecting ability of the members 42.

Other suitable reflecting shaped members can be employed in conjunction with or in place of the cup shaped reflectors 42 as is readily apparent to one skilled in the art.

Conveniently, as shown, the reflectors 42 are positioned so as to provide a honey-comb effect, staggered latticed network adjacent the fins 38. Such an arrangement provides the added advantage that the open areas 50 between junctions of the cups 42 act as additional cooling means or thermal barrier thereby further protecting fins 38.

The reflecting-cooling means 42 can be fabricated from any structural material having the requisite strength, a low damping coefficient, low sound absorption, being substantially chemically inert to oxidizing and reducing atmospheres which may be present in the combustion zone and which have a reflective surface of high thermal conductivity for redistributing both high velocity explosive and light radiation. The members 42 usually are fabricated from copper, tungsten, refractory carbides, -silicides or -borides, ferrous based alloys, stainless steels, rhodium and the like. The reflective surface of the members 42 ordinarily is a plated, bonded or otherwise attached coating of platinum, silver, gold and the like.

The explosion chamber 30 is of a diameter and length such that the pulsed ignitions of the fuel-air combustion mixtures operate at resonant frequencies thereby further enhancing the rate of cooling of precompressed fuel-air mixtures when it fires thus putting the time of heat transfer to the hardware of the apparatus at a minimum. The spacing of the shock wave reflecting and focusing members 42 preferably is at the integral wave lengths of either the fundamental wave or a higher frequency overtone of the resonant frequency of the combustion tube 28 as a whole.

The effective length and diameter of the tube 28 is such that the resonance of the length is an integral multiple of that of the layered reflective unit. This makes the main, high pressure explosive pulses from the ignition of the combustion mixture shorter and more intense. This then assures conversion of a larger percentage of high energy into a forward velocity than if the combustion tube parts were not coupled resonantly. This latter conversion in turn serves to further baffle the system against self-destruction as well as to give quick cooling through rapid conversion of the so-generated kinetic energy into work.

A conduit-nozzle injection means assembly 52 for injecting of fuel or a fuel-air mixture and the inert gas into the explosion chamber is positioned at the end of the combustion tube 28 in the end containing the one way check valve assembly 34 and on the side of the check valve assembly 34 opposite the explosion chamber 30.

This injection assembly 52 communicates through one valve 54 with a fuel or fuel-air mixture supply (not shown). The assembly 52 also communicates through valve 56 with an inert gas supply.

Valves 54 and 56 both are actuated and inactivated through a timer-programmer means 58.

The exhaust section 46 of the combustion tube 28 leads to a turbine nozzle system, a thrust nozzle or other apparatus (not shown) to be driven by a working gas stream generated in the combustion apparatus. Preferably, the exhaust tube 46 does not provide a direct in-line passage between the explosion zone 30 and turbine or work piece being activated by the high velocity-high kinetic energy working gas stream. Rather, this contains a gentle curve or slope, e.g. from about 2 to about 7 degrees out of line, which is sufficient to break up straight line flow of the working gas stream. This assures that the work piece is not subjected to the direct extreme highest temperatures initially present in the working gas and also provides for better homogeneity in the blended working gas.

An electrical spark, chemical, high temperature resistance or other igniter means 60 of a type and construction to provide for substantially instantaneous complete ignition of a fuel-air mixture in the explosion chamber 30 is positioned therein. Lasers or ion and electron beams which are accommodated by small appropriate ports also are satisfactory.

Alternatively, as an igniter, a narrow diametered tube 62 can be positioned within the injection assembly 52. This conduit 62 which is connected to a supply source (not shown) of a radiant energy absorber projects a short distance into the explosion chamber 30 and provides during operation for introduction of a pencil-like shaft of a radiant energy generator medium into the fuel-air mixture to ignite the mix.

In operation of the depicted combustion the finned structure with reflective directionalizing cups 42 in the explosion chamber 30 provides a curved path for the inert gas which passes along and between the fins 38 thus providing a minimum of turbulence adjacent to the walls of the explosion chamber 30. This assures a leaner fuel composition next to the walls.

The following example will serve to further illustrate the present invention but is not meant to limit it thereto.

*Example.*—A turbojet engine is provided having compressed air inlets connected to four combustion tubes of the type shown in the figures, i.e. explosion tubes, through four one way check valve assemblies one each connected to the entrance of the combustion tubes. The exits of the burner tubes are directed at the nozzles discharging onto the turbine wheel blades.

In operation of the engine in accordance with the present novel process, a predetermined quantity of air (inert gas) from the inlet is passed through the one way check valve shock wave trap into the four burner tubes. In each of these a fuel or a fuel-air mixture having a liquid hydrocarbon fuel, such as kerosene, formulated jet fuels such as JP-4 fuel, freshly cracked oil products like light weight petroleum products such as $CH_4$, $C_2H_6$, $C_2H_4$, $H_2$, CO, $C_2H_2$ and the like, is metered in a sequential manner through a controlled, program controlled, valve assembly and the conduit-nozzle such that there is ignition and combustion of a predetermined blend and quantity of fuel-air mixture in only one tube at a time. Following the fuel or fuel-air injection and prior to ignition of the combustion mixture an additional small slug of inert gas (e.g. air) is introduced into the rear end of the combustion zone. Because of the check valve shock wave traps, the resulting high pressure-high temperature explosion products can move only toward the nozzle. The forward portion of this tube is filled with unfueled inert air which is further compressed and accelerated by the high pressure-high temperature explosion products. This unheated air becomes heated and compressed by adiabatic compression from the extra high temperature-high pressure explosion products and the so-heated slug is directed through the nozzles against the turbine blades. This operation is repeated by metering controlled quantities of fuel or fuel-air mixture and air injection successively on a programmed basis into the remaining three tubes and igniting these in sequence. This process is continued in orderly cycles thereby to produce a smooth, high pressure-high temperature working gas stream.

It is to be understood that partially expanded process gases from a previous cycle of operation can be used as the inert gas in the operation of the turbojet engine described in this example.

Various modifications can be made in the present invention without departing from the spirit or scope thereof for it is understood that I limit myself only as defined in the appended claims.

I claim:

1. A process for producing a high kinetic energy working mass which comprises;
   (a) separately providing a displaceable inert mass and an explosive fuel-oxidizer mixture into an explosion chamber in a manner such that at least a first portion of said inert mass is in front of said fuel-oxidizer mixture and an additional portion of said inert mass is behind said fuel-oxidizer mixture and said explosion chamber is cushioned by said displaceable inert mass.
   (b) explosively firing said fuel-oxidizer mixture thereby accelerating said displaceable mass in front of the high velocity, high energy combustion products by the firing of said fuel-oxidizer mixture, said chamber adjacent said additional portion of said inert mass momentarily at the instant of ignition of said fuel-oxidizer mixture being cushioned by said additional portion of said displaceable inert mass,
   (c) repeating process steps (a) and (b) on an orderly cyclic sequence, and
   (d) directing the resulting high velocity-high kinetic energy working product stream from said explosion chamber and extracting energy therefrom.

2. The process as defined in claim 1 wherein the displaceable inert mass is partially expanded process gases and the fuel-oxidizer mixture is a precompressed blend of hydrocarbon fuel and air.

3. The process as defined in claim 2 wherein the amounts of fuel and air in the fuel-air blend ranges from about stoichiometric up to about 10 percent excess air of that required for combustion of said fuel.

4. The process as defined in claim 1 wherein the fuel and oxidizer are introduced separately into the explosion chamber and are blended into said explosive mixture therein.

5. A combustion process for producing a high kinetic energy working gas stream which comprises;
   (a) providing a combustion chamber having an explosion chamber and connected at its entrance a substantially one way passage which restricts reverse high pressure gas flow,
   (b) directing a predetermined quantity of an inert gas through said passage into said combustion tube,
   (c) introducing a predetermined quantity of a fuel-oxidizer combustion mixture into said explosive chamber to provide a fuel-oxidizer mixture at a ratio so as to provide a predetermined combustion product temperature and pressure.
   (d) passing an additional quantity of inert gas into the explosion chamber behind the fuel-oxidizer combustion mixture, (e) substantially instantaneously igniting the fuel-oxidizer mixture,
(f) absorbing the peak of the explosive energy from said explosive combustion by said inert gas in front of the ignited fuel-oxidizer mixture thereby compressing and accelerating said inert gas,
(g) directing the resulting gaseous mass toward a nozzle system as a high temperature-high velocity working gas stream, and
(h) repeating the introduction of predetermined quantities of inert gas and fuel-air mixture, inert gas compressing and accelerating operation in a cyclic, orderly sequence.

6. The process as defined in claim 5 wherein the fuel is a hydrocarbon and the oxidizer is air, said fuel and oxidizer being introduced separately into said explosion chamber and blended therein to provide the fuel-air combustion mixture.

7. A combustion apparatus for producing a high kinetic energy working gas stream which comprises in combination,
   a combustion tube having an explosion chamber intermediate its ends, said explosion chamber fitted with an igniting means, said igniting means providing substantially instantaneous ignition of an explosive fuel-oxidizer mixture,
   a fuel, oxidizer and inert gas injection means positioned in one end of said combustion tube and communicating with said explosion chamber,
   a one-way check valve assembly connecting said combustion tube and said injection means, said check valve assembly positioned to provide flow towards said explosion chamber,
   a controlled fuel and oxidizer supply source communicating with said injection means on the inlet side of said check valve assembly and a controlled inert gas supply source also communicating with said combustion tube on the inlet side of said check valve assembly,
   a flow control programmer means connected to said fuel and oxidizer supply source and said inert gas supply source, said programmer means providing for cyclic metering of an inert gas charge, a fuel-oxidizer mixture charge, and then an inert gas charge into said explosion chamber prior to ignition, and
   the other end of said combustion tube defining an exhaust.

8. The apparatus as defined in claim 7 wherein the interior surface of the explosive chamber is fitted with a multiplicity of fins, said fins extending substantially the length of said chamber, and at least a one layer thick array of hollow paraboloidal cup members attached to said fins at least in the vicinity of the ignition zone of said explosion chamber, said members positioned such that their open ends face said exhaust.

9. The apparatus as defined in claim 8 wherein the paraboloidal cup members are positioned onto said fins to provide a staggered latticed honeycombed network.

References Cited

UNITED STATES PATENTS

| | | | |
|---|---|---|---|
| 2,543,758 | 3/1951 | Bodine | 60—247 |
| 2,628,471 | 2/1953 | Dunbar | 60—247 |
| 2,717,637 | 9/1955 | Huber | 60—247 |
| 2,888,803 | 6/1959 | Pon | 60—39.77 |
| 3,005,310 | 10/1961 | Reder | 60—39.77 |
| 3,365,880 | 1/1968 | Grebe | 60—39.03 |

CARLTON R. CROYLE, *Primary Examiner.*

D. HART, *Assistant Examiner.*

U.S. Cl. X.R.

60—39.03, 39.76, 247